United States Patent [19]

Anorga

[11] 4,315,078
[45] Feb. 9, 1982

[54] FLAME RETARDANT FLEXIBLE POLYURETHANE FOAM CONTAINING FINELY DIVIDED INORGANIC SALT WHEREIN A MOLD OF SAID SALT CONTAINS AT LEAST FIVE MOLES OF WATER

[75] Inventor: Carlos J. Anorga, San Pedro, Calif.

[73] Assignee: The Upjohn Company, Kalamazoo, Mich.

[21] Appl. No.: 171,449

[22] Filed: Jul. 23, 1980

[51] Int. Cl.³ ............................................. C08G 18/14
[52] U.S. Cl. .................................. 521/103; 521/106; 521/119; 521/120; 521/123
[58] Field of Search ............... 521/103, 106, 119, 120, 521/123

[56] References Cited

U.S. PATENT DOCUMENTS 2,895,926  7/1959  Rappaport et al. .................. 521/123
2,981,700  4/1961  Parker et al. ....................... 521/123
3,909,464  9/1975  Anorga et al. ...................... 521/160

Primary Examiner—Maurice J. Welsh
Attorney, Agent, or Firm—James S. Rose; Denis A. Firth

[57] ABSTRACT

Flexible polyurethane foams are described which are the product of reaction under foam producing conditions of a combination of (a) an aromatic polyisocyanate; (b) a polyether polyol with the optional use of a minor amount of a cross-linking polyol; (c) antimony oxide; (d) a polyhalogenated aromatic compound; and (e) a hydrated inorganic salt.

The foams have flame retardant properties superior to those of the prior art while at the same time having physical properties equal or superior to the prior art materials. Accordingly, the foams of the invention meet very stringent tests for fire retardance required of seat cushioning, mattresses, and like materials in aircraft, institutions such as hospitals, convalescent homes, and the like.

13 Claims, No Drawings

FLAME RETARDANT FLEXIBLE POLYURETHANE FOAM CONTAINING FINELY DIVIDED INORGANIC SALT WHEREIN A MOLD OF SAID SALT CONTAINS AT LEAST FIVE MOLES OF WATER

BACKGROUND OF THE INVENTION

1. Field of the Invention

This invention relates to cellular polyurethanes and is more particularly concerned with flame retardant flexible polyurethane foams and with processes for their preparation.

2. Description of the Prior Art

Fire retardant flexible and semi-flexible polyurethane foams which are characterized by good physical properties and good fire resistance are well known in the art; see U.S. Pat. No. 3,909,464 and the art cited therein. The patent discloses the very efficacious combination of antimony oxide, a polyhalogenated aromatic compound and alumina trihydrate. The latter is not actually a hydrate but is rather a true hydroxide.

The use of inorganic hydrated salts as fire retarding agents has been recognized in the polymer art in general and in polyurethanes in particular; see Japanese specification No. J5 4149796, which, typically, discloses the use of salts such as calcium chloride hexahydrate in polyurethane foams.

However, the prior art also discloses the use of the same kinds of inorganic hydrated salts as blowing agents for polyurethanes through the action of the hydrated water with the isocyanate to produce carbon dioxide. In fact, the use of such materials as fire retardants in foams has been greatly hampered by their tendency to produce very low density foams because of unwanted blowing action. Typically, the use of calcium chloride hexahydrate, magnesium sulfate heptahydrate, sodium sulfate decahydrate, and the like as blowing agents in cellular polyurethanes is disclosed in Polyurethanes Chemistry and Technology, Part II, Saunders and Frisch, page 285, 1964, John Wiley and Sons, Inc., New York, N. Y.; Plastic Foams, Part I, Frisch and Saunders, page 139, 1972, Marcel Dekker Inc., New York, N. Y.; and U.S. Pat. No. 2,981,700.

Surprisingly, it has now been discovered that certain true hydrated inorganic salts can be employed in place of the alumina trihydrate in the fire retardant combination disclosed in U.S. Pat. No. 3,909,464 cited supra, without there being a problem with excessive or unwanted blowing action in the formation of fire retardant polyurethane foams. In fact, the flexible foams in accordance with the present invention have physical properties equal, and, in some cases superior, to those of the cited art.

Further, and even more unexpected, the fire resistance of foams in accordance with the present invention is superior to that of the foams according to U.S. Pat. No. 3,909,464 cited supra.

SUMMARY OF THE INVENTION

This invention comprises flame retardant flexible polyurethane foams prepared under foam producing conditions from an aromatic polyisocyanate, a polyether polyol having an equivalent weight from about 500 to about 2500 and a functionality from about 2.0 to about 4.0, antimony oxide and a polyhalogenated aromatic compound wherein the improvement comprises employing in the foam forming reaction mixture the following ingredients in parts by weight based on 100 parts of said polyether polyol:

(a) from about 4 to about 30 parts of antimony oxide;
(b) from about 4 to about 40 parts of a polyhalogenated aromatic compound; and
(c) from about 30 to about 60 parts of a finely divided hydrated inorganic salt wherein a mole of said salt contains at least 5 moles of water of hydration, and employing a ratio of isocyanate equivalents to total equivalents of active hydrogen containing materials in the foam forming reaction mixture within a range of from about 0.90:1.0 to about 1.0:1.0.

The invention also comprises processes for the preparation of the above foams.

The term "finely divided" in reference to powdered solids as in (c) above means fine enough to pass at least a USA Standard 100 mesh screen, and preferably fine enough to pass at least a USA Standard 200 mesh screen.

The term "hydrated inorganic salt" means a compound formed by the combination of water with an inorganic salt wherein water is recoverable upon heating said hydrated salt at a temperature of from about 90° C. to about 350° C., preferably from about 145° C. to about 310° C.

Preferred hydrated inorganic salts are those belonging to the class of alkali metal inorganic salts and alkaline earth metal inorganic salts which are inclusive of the hydrates of sodium, potassium, lithium, magnesium, and calcium sulfates, sulfites, borates, phosphates, orthophosphates, pyrophosphates, hypophosphates, metaphosphates, acid phosphates, and mixtures thereof.

DETAILED DESCRIPTION OF THE INVENTION

The flexible polyurethane foams of the invention are prepared using techniques well known in the art; see for example U.S. Pat. No. 3,909,464 cited supra whose disclosure relative to the preparation of flexible foams is incorporated herein by reference. Included in the present flexible foams are those foams referred to as "semi-flexible" which means simply those flexible foams which are characterized by a high order of compressive strength.

The novelty of the present invention over the prior art, particularly U.S. Pat. No. 3,909,464, resides, inter alia, in the use of the hydrated inorganic salts defined above in place of the alumina trihydrate in the fire retardant combination set forth in the cited reference. Additionally, the use of differing proportions in the instant fire retardant combinations, and the use of particular proportions of isocyanate to active hydrogen-containing material, which latter feature will be discussed in more detail below, all give rise to the unexpected and beneficial properties of the instant foams.

Furthermore, the polyisocyanates which can be employed in preparing the fire retardant polyurethane foams of the invention are broader in scope than the particular mixtures called for in U.S. Pat. No. 3,909,464 and include the aromatic polyisocyanates well known to those skilled in the flexible polyurethane foam art such as 2,4-toluene diisocyanate, 2,6-toluene diisocyanate, mixtures of the 2,4- and 2,6-toluene diisocyanates in varying proportions, the diphenylmethane diisocyanates, both pure and crude, which contain high (at least 15 percent by weight of the diisocyanate fraction) 2,4-diphenylmethane diisocyanate contents, as typically disclosed in British Pat. No. 1,422,056, and the mixtures similar to those disclosed in U.S. Pat. No. 3,909,464 comprising from about 5 to about 95 percent by weight of toluene diisocyanates (2,4-, and 2,6-isomers and varying mixtures such as the 80/20 and 65/35 weight percent mixtures thereof) with from about 95 to about 5 percent of polymethylene polyphenyl polyisocyanates containing from about 20 percent to about 90 percent by weight of methylenebis(phenyl isocyanate) with the remaining 10 to 80 percent comprising polymethylene polyphenyl polyisocyanates of functionality higher than 2.0. Such polyisocyanates and methods for their production are well known in the art; see for example U.S. Pat. Nos. 2,683,730; 2,950,263; 3,012,008 and 3,097,191.

A preferred group of aromatic polyisocyanates in accordance with the present invention are (a) the mixtures of toluene diisocyanate and polymethylene polyphenyl polyisocyanates noted above, and (b) the isomeric toluene diisocyanate mixtures in the percent proportions by weight of from about 50 to about 80 percent 2,4-toluene diisocyanate and the remaining 50 to 20 percent being 2,6-toluene diisocyanate.

A most preferred group is the latter described mixtures of 2,4- and 2,6-toluene diisocyanates. A most preferred species of this group contains the 2,4- and 2,6-isomers in about 50/50 weight percent proportions.

Criticality resides in the proportion of isocyanate employed in the instant processes in order to avoid unwanted blowing action. Generally speaking, in the preparation of polyurethane foams there is a rather wide latitude allowed in the proportions of total isocyanate equivalents to active hydrogen-containing material particularly in regard to there being excess isocyanate present (see U.S. Pat. No. 3,909,464, column 5, line 23 wherein the isocyanate to active hydrogen can go as high as 1.3:1.0). The term "active hydrogen-containing material" is used in the sense normally accepted by those skilled in the polyurethane art to denote all of the ingredients having active hydrogen atoms which are included in the formulation specifically for reaction with the isocyanate component such as organic polyols, organic amines, water for blowing the foam, and the like. The term is not inclusive of water which is present as a complex or a hydrate such as the hydrated inorganic salts employed in the fire retardant combination in accordance with the present invention except as follows.

If some portion of the hydrated inorganic salt is specifically employed to act as a blowing agent component then that portion of the hydrated salt would fall within the definition of active hydrogen-containing material in respect of its water content.

Accordingly, in the present invention the ratio of isocyanate equivalents to total equivalents of active hydrogen containing materials should fall within a range of from about 0.90:1.0 to about 1.0:1.0, preferably about 0.95:1.0 to about 1.0:1.0, most preferably about 1.0:1.0. If isocyanate much in excess of the upper limit be present then it will tend to react with the water contained in the hydrated inorganic salt components causing the formation of carbon dioxide and resulting in unwanted blowing action and the production of lower density foams than are desired.

The polyols which are employed in making the flexible foams of the invention are well known in the art and are the same as the class of polyether polyols disclosed in U.S. Pat. No. 3,909,464 having an equivalent weight of about 500 to about 2500 and a functionality of about 2 to about 4 and whose disclosure relative thereto is incorporated by reference herein. Preferably, the polyether polyols are triols having an equivalent weight of about 900 to about 2300.

The above types of polyether polyols are well known in the art as are the methods for their preparation. Said polyether polyols include polyoxyalkylene glycols such as the polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethylene oxypropylene glycols prepared in a similar manner utilizing a mixture of ethylene oxide or propylene oxide or a sequential addition of ethylene oxide and 1,2-propylene oxide; polyether glycols prepared by reacting ethylene oxide, propylene oxide or mixtures thereof with mono- and polynuclear dihydroxybenzenes, e.g. catechol, resorcinol, hydroquinone, orcinol, 2,2-bis(p-hydroxyphenyl)propane, bis(p-hydroxyphenyl)methane, and the like; and polyethers prepared by reacting ethylene oxide, propylene oxide, or mixtures thereof, with aliphatic polyols such as glycerol, sorbitol, trimethylolpropane, 1,2,6-hexanetriol, pentaerythritol and the like.

In order to produce those flexible foams of the invention which are classified as semi-flexible as discussed above, it is necessary to include in the polyol component a low molecular weight polyol having a functionality of 3 or higher, preferably from 3 to 6, and a molecular weight from about 90 to about 800 in order to increase the degree of cross-linking and thereby, in part, increase the load bearing capacity of the resulting foam. The proportion of cross-linking agent component for this purpose varies according to the properties desired in the resulting foam. Generally speaking, the amount of cross-linking polyol employed can vary from about 2 percent to about 30 percent by weight of the total polyol employed.

Examples of cross-linking polyols having a functionality of 3 to 6 are glycerol, pentaerythritol, triethanolamine, hydroxyalkylated aliphatic diamines such as N,N,N',N'-tetrakis(2-hydroxypropyl)ethylene diamine, N,N,N',N'-tetrakis(2-hydroxyethyl)ethylene diamine, and the like, and low molecular weight (within the above cited range) alkyene oxide adducts of glycerol, trimethylolpropane, hexane-1,2,3-triol, sucrose, sorbitol, methyl glucoside, and the like.

Preferred species of cross-linking polyols are glycerine, and triethanolamine, and mixtures thereof.

The antimony oxide is advantageously employed in making the fire retardant foams of the invention in an amount falling within the range of from about 4 to about 30 parts, preferably from about 8 to about 20 parts, per 100 parts of the polyether polyol. The antimony oxide is generally introduced in the foam mix by blending, in the form of a finely divided powder (as defined above), with the polyol component prior to the addition of the latter to the foam reaction mixture.

The "polyhalogenated aromatic compound" employed in preparing the fire retardant flexible foams of the invention is inclusive of polyhalogenated aromatic diamines such as 3,3'-dichlorobenzidine, 2,3,2',3'-tetrachlorobenzidine, 3,3'-dibromobenzidine, methylenebis(2-chloroaniline), methylenebis(2,3-dichloroaniline), methylenbis(2,6-dichloroaniline), and the like; polyhalogenated benzenes such as tetrachlorobenzene, hexachlorobenzene, tetrabromobenzene, hexabromobenzene, decabromodiphenyl ether, pentabromoethylbenzene, and the like; polyhalogenated bisphenol-A such as tetrachloro- and tetrabromo-bisphenol-A, dichlorodibromo-bisphenol-A, and the like. The preferred polyhalogenated aromatic compounds are polybrominated hydrocarbons which are insoluble in water, have a melting point above about 50° C. and contain at least 60 percent by weight of bromine. The most preferred polyhalogenated aromatic compounds are hexabromobenzene, decabromodiphenyl ether, and pentabromoethylbenzene.

The polyhalogenated aromatic compound is advantageously employed in making the fire retardant foams of the invention in amounts falling within the range of from about 4 to about 40 parts, preferably from about 10 to about 30 parts, per 100 parts of the polyether polyol. The polyhalogenated compound is generally introduced into the foam mix in the same manner as the antimony oxide, namely, as a dispersion in the polyol component.

The inorganic salts defined above and employed as the third component of the fire retardant combination are well known and for the most part are readily available commercially.

In order to achieve the increased fire retardance of the present foams the salts should contain at least 5 moles of hydrated water per mole of inorganic salt, and, generally speaking, up to 10 moles. Further, in order for the water of hydration to be available as a fire quenching agent later, as well as to avoid unwanted blowing action during foam formation, the salt should be one which does not begin to lose any of its hydrated water below about 90° C. and preferably not below about 145° C.

It will be understood by those skilled in the art that the temperatures referred to herein in respect of water evolution from a hydrated salt are in reference to those temperatures observed by controlled experiments specifically for determining water loss from hydrates and recorded in the reference literature such as the Handbook of Chemistry and Physics, 60th Edition CRC Press Inc., 1979-1980, Boca Raton, Fla.

Generally speaking, the hydrated inorganic salts for use in the present invention will not begin to lose water much below about 145° C. Even those salts which are rated to lose a minor amount (1 mole) of hydrated water in the range of 90° C. to 145° C. can be employed without undue effect on foam densities or loss of resultant fire retardant properties.

Advantageously, the major part of the hydrated water should be evolved without exceeding 350° C. and preferably 310° C. in order to achieve optimum fire retardancy of the foams in accordance with the present invention.

Illustrative of the hydrated salts to be used in accordance with the present invention are zinc sulfate heptahydrate, zinc bromate hexahydrate, copper sulfate pentahydrate, cobaltous orthophosphate, octahydrate, ferrous sulfate pentahydrate, manganous sulfate heptahydrate, nickel sulfate hexahydrate, sodium sulfite heptahydrate, sodium dihydrogen pyrophosphate hexahydrate, sodium pyrophosphate decahydrate, magnesium sulfate heptahydrate, magnesium sulfite hexahydrate, magnesium orthophosphate octahydrate, potassium tetraborate octahydrate, lithium metaborate octahydrate, calcium metaborate hexahydrate, and the like.

Preferred amongst the hydrated salts are magnesium sulfate heptahydrate, magnesium orthophosphate octahydrate, and sodium pyrophosphate decahydrate. The most preferred species is magnesium sulfate heptahydrate.

The hydrated salt is advantageously employed in an amount falling within the range of from about 30 to about 60 parts, preferably from about 35 to about 55 parts, per 100 parts of the polyether polyol. The salt is introduced into the foam reaction mixture in the same manner as the other fire retardants in a finely divided form. The finely divided form as defined above will pass through at least a USA Standard 100 mesh screen and preferably finer than that.

The flexible foams in accordance with the present invention as noted above are prepared using standard techniques well known to those skilled in the art either by the one-shot or prepolymer technique which techniques have already been incorporated by reference herein.

Any of the catalysts conventionally employed in the art to catalyze the reaction of a polyol and an isocyanate can be employed as catalyst in the preparation of the flexible foams of this invention. Such catalysts are described, for example, by Saunders et al. ibid, Part I, pages 228-232, and by Britain et al., J. Applied Polymer Science, 4, pages 207-211, 1960. Such catalysts include organic and inorganic salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, N,N,N', N'-tetramethylethylenediamine, N,N,N',N'-tetraethylethylenediamine, N,methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, 2,2'-bis(dimethylamino)diethyl ether and the like. The preferred catalysts for use in the process of the invention are a combination of stannous octoate or dibutyltin dilaurate with at least one of the tertiary amines selected from N,N,N', N'-tetramethyl-1,3-butane diamine, 2,2'-bis(dimethylamino) diethyl ether, and triethylenediamine, or a combination of the latter two amines with dibutyltin dilaurate. The amount of catalyst employed is generally within the range of about 0.1 to about 2 percent by weight based on the total weight of reactants.

The blowing agents which can be employed in the process of the invention are those conventionally employed in the preparation of flexible polyurethane foams. Illustrative of said blowing agents are water (which generates carbon dioxide by reaction with isocyanate) and volatile solvents such as the lower molecular weight aliphatic hydrocarbons and highly halogenated lower-aliphatic hydrocarbons, for example trichloromonofluoromethane, dichlorodifluoromethane, chlorotrifluoromethane, 1,1-dichloro-1-fluoroethane, 1-chloro-1,1-difluoro-2, 2-dichloroethane, and 1,1,1-trifluoro-2-chloro-2-fluorobutane, and the like. If desired, a mixture of water and one or more of said volatile solvents can be used as blowing agent. The final foam density of the flexible foams produced by the process of the invention is a function of the amount of blowing agent used. In general the higher the amount of blowing agent, the lower the density of the foam. Illustratively, when water is used as the sole blowing agent, the amount of water required to produce a low density foam for use, for example, as a sponge type material is generally of the order of about 1.5 to about 5.0 parts per hundred parts of total polyol. When a semi-flexible foam of higher density is required, the amount of water employed as sole blowing agent is of the order of about 0.5 to about 1.5 parts per hundred parts of total polyol.

Optionally, or in addition to one of the blowing agents disclosed above, the hydrated inorganic salts of the invention can be employed as blowing agents in accordance with U.S. Pat. No. 2,981,700 cited supra. In this event, the amount of the salt chosen for blowing action is determined on the basis of its water content in relation to the amount of water called for by the above ranges. This amount of water then becomes part of the active hydrogen containing materials designated for reaction with isocyanate as discussed above.

Optional additives such as dispersing agents, cell stabilizers, surfactants, and the like which are commonly employed in the fabrication of flexible polyurethane foams, can be employed in the process of the invention. Thus, a finer cell structure can be obtained if water-soluble organosilicone polymers are used as surfactants. Organosilicone polymers obtained by condensing a polyalkoxy polysilane with the monoether of a polyalkylene ether glycol in the presence of an acid catalyst are representative of those surfactants which can be used for this purpose. Other surfactants such as ethylene oxide modified polypropylene ether glycols can be used, if desired, to obtain better dispersion of the components of the foam mixture.

Other additives such as dyes, pigments, soaps and metallic powders and other inert fillers can be added to the foam mixture to obtain special foam properties in accordance with practices well-known in the art.

The flexible polyurethane foams produced by the process of the invention are high quality foams useful for a variety of purposes in which fire retardant flexible foams are required. The foams of the invention are particularly useful for cushioning and for mattresses to be used in locations in which strict compliance with fire safety codes is required. In particular, the flexible foams of the invention are found to pass the very stringent methenamine pill test in accordance with ASTM Test D-2859-70T which measures the diameter and depth of the charred portion of a foam sample after a methenamine pill has been set afire while resting on the sample.

Further, the foams in accordance with the present invention are superior to prior art foams when subjected to the Cal 117 test which is a test designed by the state of California to test flame retardance of resilient filling materials used in upholstered furniture (see Footnote 12, Table I).

Surprisingly, as was noted above, the flexible foams of the present invention are prepared with flame retardant additives which include salts which heretofore have been recognized mainly for their foam blowing activity because of their water of hydration. At the same time, the present foams have superior flame resistant properties compared to the prior art while maintaining or exceeding the prior art foam physical properties.

The following examples describe the manner and process of making and using the invention and set forth the best mode contemplated by the inventors of carrying out the invention but are not to be construed as limiting.

EXAMPLE 1

The data in Table I below sets forth a comparison of the properties of a flexible Foam A in accordance with the present invention with those of Foam B wherein the fire retardant combination contains alumina trihydrate as disclosed in the prior art (U.S. Pat. No. 3,909,464) instead of the magnesium sulfate heptahydrate used in Foam A.

The foams were prepared by mixing for about 10 seconds the ingredients in the proportions of parts by weight set forth in Table I in a one quart container and using an agitator driven at high speed by a drill press motor.

The physical properties of Foam A which are those of a good flexible foam are comparable to a good prior art foam (Foam B). Additionally, Foam A is superior to B in all of the fire tests and particularly noteworthy in this regard are the results of the Burning Paper test and the Pill test both defined below.

TABLE I

| Foam | A | B |
|---|---|---|
| Ingredients (pts. by wt.) | | |
| Component A: | | |
| Isocyanate I[1] | 44.43 | 44.43 |
| Component B: | | |
| Voranol ® 4701[2] | 100.0 | 100.0 |
| Triethanolamine | 5.08 | 5.08 |
| Glycerine | 3.39 | 3.39 |
| Antimony oxide[3] | 11.86 | 11.86 |
| Decabromodiphenyl ether[4] | 23.73 | 23.73 |
| Magnesium sulfate heptahydrate[5] | 49.15 | — |
| Alumina trihydrate[6] | — | 49.15 |
| L-5303[7] | 0.25 | 0.25 |
| Component C: | | |
| Water | 1.48 | 1.48 |
| Dabco 33LV[8] | 1.36 | 1.36 |
| Niax A-1[9] | 0.17 | 0.17 |
| Component D: | | |
| Dibutyltin dilaurate | 0.04 | 0.04 |
| Properties: | | |
| Density, pcf | 3.78 | 3.75 |
| ILD(lbs.)[10] 25% | 18 | 19 |
| 65% | 64 | 65 |
| Sag factor[11] | 3.56 | 3.42 |
| Tensile str., psi | 5.8 | 7.2 |
| Elongation, % | 114 | 102 |
| Cal 117 Test[12] | | |
| Flame, secs. | 1.8 | 1.9 |
| Glow, secs. | 5.2 | 12.0 |
| Void, inches | 1.7 | 2.0 |
| Char, inches | 4.0 | 4.2 |
| Pill Test[13] | | |
| Diameter × depth, inches | 0.94 × 0.44 | 1.3 × 0.7 |
| Burning Paper Test[14] | | |

TABLE I-continued

| Foam | A | B |
|---|---|---|
| % wt. loss | 1.0 | 1.8 |

Footnotes to Table I
[1]Isocyanate I is a blend of 70 percent by weight of toluene diisocyanate (80/20 percent ratio by weight of 2,4/2,6-isomer) and 30 percent by weight of PAPI ® 901 which is a polymethylene polyphenyl (isocyanate), viscosity, cps at 25° C. = about 80, Isocyanate equivalent weight = 133, supplied by The Upjohn Company, Laporte, Texas.
[2]Voranol ® 4701 is a polyoxyalkylene glycerine based triol, eq. wt. = 1670 supplied by Dow Chemical, Midland, Mich.
[3]The antimony oxide was finely divided to pass a 200 mesh screen.
[4]The decabromodiphenyl ether was finely divided to pass a 200 mesh screen.
[5]The magnesium sulfate heptahydrate was finely divided to pass a 200 mesh screen.
[6]The alumina trihydrate was finely divided to pass a 200 mesh screen.
[7]L-5303 is a silicone surfactant for high resiliency polyether foams and is supplied by Union Carbide Corp., New York, N.Y.
[8]Dabco 33LV is a urethane catalyst supplied by Air Products & Chemicals Inc. and is 33 percent by weight of triethylenediamine dissolved in dipropylene glycol.
[9]Niax A-1 is a urethane catalyst supplied by Union Carbide Corp., New York, N.Y., and is 70 percent by weight of bis(2-dimethylaminoethyl)ether dissolved in dipropylene glycol.
[10]ILD refers to the identation load deflection test in accordance with ASTM D 1564 which measures the pounds (lbs.) required to give the stated percent deflection.
[11]Sag factor is the ratio of the 65/25 values of the ILD test described in footnote [10].
[12]Cal 117 test is carried out in accordance with the requirements, test procedure and apparatus for testing the flame retardance of resilient filling materials used in upholstered furniture as set forth in Technical Information Bulletin 117 January 1980 published by the State of California, Department of Consumer Affairs, Bureau of Home Furnishings, North Highlands, California. Test samples measuring 12 inches × 3 inches × ½ inch are suspended vertically and a burner flame applied to the bottom of the sample for 12 seconds. The flame time in seconds measures the time that the sample continues to flame after the removal of the burner flame; the glow time in seconds measures the time the sample continues to glow after it has ceased to flame; char length in inches measures the length up the sample to which the char front extends; and void in inches measures the depth of the char into the sample.
[13]The Pill test is the methenamine pill test in accordance with ASTM Test D-2859-70T and measures the diameter and depth of the charred portion of the sample in inches.
[14]The Burning Paper test is a burning newspaper test which measures the percent weight loss of a test sample measuring 16 inches × 16 inches × ¼ inch thick when ignited by a 1 ounce flaming sample of shredded newspaper in the bottom of an open top 55 gallon steel drum and allowed to burn freely until it extinguishes itself.

EXAMPLE 2

The following five flexible foams (C through G inclusive) were prepared in accordance with the present invention using the procedure described in Example 1 and the ingredients in the proportions of parts by weight set forth in Table II.

The foams represent variations in the polyol component, cross-linking polyol, isocyanate component, and the use of a phosphorus fire retardant in addition to the combination of fire retardants in accordance with the present invention in Component B. All of the foams are characterized by good flexible properties and good flame resistance. Optimum overall properties were noted for Foam D.

TABLE II

| Foam | C | D | E | F | G |
|---|---|---|---|---|---|
| Ingredients (pts. by wt.) | | | | | |
| Component A: | | | | | |
| Isocyanate II[1] | 48 | 38.96 | — | — | — |
| Isocyanate III[2] | — | — | 45.68 | — | — |
| Isocyanate IV[3] | — | — | — | 43.63 | — |
| Isocyanate V[4] | — | — | — | — | 45.16 |
| Component B: | | | | | |
| Voranol ® 4701 | 100 | 100 | 100 | 100 | — |
| Niax 11-34[5] | — | — | — | — | 100 |
| L-5303 | 0.51 | — | 0.17 | 0.59 | 0.68 |
| Triethanolamine | 5.08 | — | 3.39 | 5.08 | 5.08 |
| Voranol 700[6] | — | 1.70 | — | — | — |
| Glycerine | — | — | — | 3.39 | 3.39 |
| Fyrol ® FR-2[7] | — | — | 1.70 | — | — |
| Antimony oxide* | 11.86 | 11.86 | 11.86 | 11.86 | 11.86 |
| Decabromodiphenyl ether* | 23.73 | 23.73 | 23.73 | 23.73 | 23.73 |
| Magnesium sulfate heptahydrate* | 49.15 | 49.15 | 49.15 | 49.15 | 49.15 |
| Component C: | | | | | |
| Water | 2.46 | 2.46 | 2.46 | 1.57 | 1.57 |
| Dabco 33LV | 0.85 | 0.85 | 0.85 | 1.36 | 1.36 |
| Niax A-1 | 0.17 | 0.17 | 0.09 | 0.17 | 0.17 |
| Component D: | | | | | |
| Dibutyltin dilaurate | 0.025 | — | — | 0.04 | 0.04 |
| Properties: | | | | | |
| Density, pcf | 3.63 | 3.8 | 3.8 | 3.4 | 3.7 |
| ILD, lbs., 25% | 18 | 27 | 16 | 12 | 17 |
| 65% | 64 | 62 | 67 | 44 | 65 |
| Sag factor | 3.56 | 2.3 | 4.18 | 3.67 | 3.82 |
| Tensile str., psi | 5.5 | 7.72 | 7.3 | 6.3 | 5.5 |
| Elongation, % | 121 | 117 | 92 | 114 | 116 |
| Cal 117 Test | | | | | |
| Flame, secs. | 0.8 | 0 | 0 | 0 | 6.4 |
| Glow, secs. | 3.0 | 0.8 | 6.6 | 5.1 | 7.2 |
| Void, in. | 1.1 | 1.5 | 0.8 | 1.4 | 1.4 |
| Char, in. | 4.0 | 4.5 | 3.3 | 4.0 | 4.1 |
| Pill Test | | | | | |
| Diameter × depth, inches | 0.90 × 0.34 | 0.875 × 0.625 | 1.0 × 0.5 | 1.0 × 0.625 | 1.0 × 0.5 |
| Burning Paper Test | | | | | |
| % wt. loss | 0.65 | 0.4 | 0.94 | 0.71 | 0.75 |

*Pass a 200 mesh screen.
Footnotes to Table II
[1]Isocyanate II is a modified toluene diisocyanate having a 50/50 percent by weight mixture of the 2,4-, and 2,6- isomers; eq. wt. = 105.5–108.5, viscosity at 25° C. = 15 to 60 cps.
[2]Isocyanate III is a blend of 80 percent by weight of Isocyanate II and 20 percent by weight of PAPI ® 901.
[3]Isocyanate IV is a blend of 81.3 percent by weight of toluene diisocyanate (80/20 percent ratio by weight of 2,4/2,6-isomer) and 18.7 percent by weight of PAPI ® 901.
[4]Isocyanate V is a blend of 70 percent by weight toluene diisocyanate (80/20) and 30 percent by weight of a polymethylene polyphenyl (isocyanate) having an eq. wt. = about 133 and a methylenebis(phenylisocyanate) content of about 60 percent by weight.
[5]Niax 11-34 is a polyoxyalkylene glycerine based triol, eq. wt. = 1134 supplied by Union Carbide Corp., New York.
[6]Voranol 700 is a multi functional cross-linking polyol, OH eq. wt. = about 80, see bulletin entitled Voranol Polyether Polyols for Rigid Urethane Foams by Dow Chemical Co., Midland, Mich.
[7]Fyrol ® FR-2 is tris-dichloropropyl phosphate supplied by Stauffer Chem. Co., Westport, Conn.

EXAMPLE 3

The following Foams H and I in accordance with the present invention were prepared according to the procedure described in Example 1 using the ingredients in the proportions of parts by weight set forth in Table III.

Magnesium orthophosphate octahydrate and sodium pyrophosphate decahydrate are the hydrated inorganic salt components of the fire retardant combinations of H and I respectively. Besides the good foam physical properties, the fire retardant properties of Foams H and I are superior to those of Foam B of Example 1 which latter foam was in accordance with the prior art.

TABLE III

| Foam | H | I |
|---|---|---|
| Ingredients (pts. by wt.) | | |
| Component A: | | |
| Isocyanate I | 44.43 | — |
| Isocyanate II | — | 48 |
| Component B: | | |
| Voranol ® 4701 | 100.0 | 100.0 |
| Triethanolamine | 5.08 | 5.08 |
| Glycerine | 3.39 | — |
| Antimony oxide | 11.86 | 11.86 |
| Decabromodiphenyl ether | 23.73 | 23.73 |
| Magnesium orthophosphate octahydrate* | 49.15 | — |
| Sodium pyrophosphate | | |

TABLE III-continued

| Foam | H | I |
|---|---|---|
| decahydrate* | — | 49.15 |
| L-5303 | 0.25 | 0.51 |
| Component C: | | |
| Water | 1.48 | 2.46 |
| Dabco 33LV | 1.36 | 0.85 |
| Niax A-1 | 0.17 | 0.17 |
| Component D: | | |
| Dibutyltin dilaurate | 0.04 | 0.04 |
| Properties: | | |
| Density, pcf | 3.79 | 3.50 |
| ILD (lbs.) 25% | 17.0 | 20.0 |
| 65% | 62.0 | 70.0 |
| Sag factor | 3.65 | 3.5 |
| Tensile str., psi | 5.5 | 5.7 |
| Elongation, % | 116 | 118 |
| Cal 117 Test | | |
| Flame, secs. | 1.5 | 0.5 |
| Glow, secs. | 4.7 | 3.5 |
| Void, inches | 1.8 | 1.2 |
| Char, inches | 4.2 | 3.9 |
| Pill Test | | |
| Diameter × depth, inches | 0.96 × 0.50 | 1.0 × 0.4 |
| Burning Paper Test | | |
| % wt. loss | 1.0 | 1.1 |

*The magnesium and sodium salts were finely divided to pass a 200 mesh screen.

EXAMPLE 4

The following Foams J and K in accordance with the present invention were prepared according to the procedure described in Example 1 using the ingredients in the proportions of parts by weight set forth in Table IV.

Magnesium sulfate heptahydrate was the hydrated inorganic salt employed in both J and K at the levels of 30 and 60 parts respectively per 100 parts of polyol. Besides the good foam physical properties, the fire retardant properties of J and K are superior to those of Foam B of Example 1 which latter foam was in accordance with the prior art.

TABLE IV

| Foam | J | K |
|---|---|---|
| Ingredients (pts. by wt.) | | |
| Component A: | | |
| Isocyanate II | 48.0 | 48.0 |
| Component B: | | |
| Voranol 4701 | 100.0 | 100.0 |
| Triethanolamine | 5.08 | 5.08 |
| L-5303 | 0.51 | 0.51 |
| Antimony oxide | 11.86 | 11.86 |
| Decabromodiphenyl ether | 23.73 | 23.73 |
| Magnesium sulfate heptahydrate* | 30.0 | 60.0 |
| Component C: | | |
| Water | 2.46 | 2.46 |
| Dabco 33LV | 0.85 | 0.85 |
| Niax A-1 | 0.17 | 0.17 |
| Component D: | | |
| Dibutyltin dilaurate | 0.04 | 0.04 |
| Properties: | | |
| Density, pcf. | 3.31 | 4.0 |
| ILD (lbs.) 25% | 16.0 | 30.0 |
| 65% | 54.0 | 101.0 |
| Sag factor | 3.38 | 3.36 |
| Tensile str., psi | 6.8 | 4.8 |
| Elongation, % | 116.0 | 80.0 |
| Cal 117 Test | | |
| Flame, secs. | 0.5 | 0.6 |
| Glow, secs. | 3.0 | 6.0 |
| Void, inches | 1.4 | 2.0 |
| Char, inches | 4.2 | 4.3 |
| Pill Test | | |
| Diameter × depth, inches | 1.0 × 0.6 | 0.875 × 0.30 |

TABLE IV-continued

| Foam | J | K |
|---|---|---|
| Burning Paper Test | | |
| % wt. loss | 1.1 | 0.6 |

*The magnesium salt was finely divided to pass a 200 mesh screen.

I claim:

1. In a flame retardant flexible polyurethane foam prepared under foam producing conditions from an aromatic polyisocyanate, a polyether polyol having an equivalent weight from about 500 to about 2500 and a functionality from about 2.0 to about 4.0, antimony oxide and a polyhalogenated aromatic compound wherein the improvement comprises employing in the foam forming reaction mixture the following ingredients in parts by weight based on 100 parts of said polyether polyol:
    (a) from about 4 to about 30 parts of antimony oxide;
    (b) from about 4 to about 40 parts of a polyhalogenated aromatic compound; and
    (c) from about 30 to about 60 parts of a finely divided hydrated inorganic salt wherein a mole of said salt contains at least 5 moles of water of hydration; and employing a ratio of isocyanate equivalents to total equivalents of active hydrogen containing materials in the foam forming reaction mixture within a range of from about 0.90:1.0 to about 1.0:1.0.

2. A foam according to claim 1 wherein there is additionally present a minor amount of a cross-linking polyol.

3. A foam according to claim 1 wherein (c) is a hydrated alkali or alkaline earth metal inorganic salt.

4. A foam according to claim 3 wherein (c) is magnesium sulfate heptahydrate.

5. A foam according to claim 3 wherein (c) is magnesium orthophosphate octahydrate.

6. A foam according to claim 3 wherein (c) is sodium pyrophosphate decahydrate.

7. A flame retardant flexible polyurethane foam which comprises the product of reaction under foam producing conditions of:
    (a) an aromatic polyisocyanate mixture selected from the group consisting of
        (i) from about 5 to about 95 percent by weight of toluene diisocyanate and from about 95 to about 5 percent by weight of polymethylene polyphenyl polyisocyanate, and
        (ii) from about 50 percent to about 80 percent by weight of 2,4-toluenediisocyanate and 50 percent to about 20 percent by weight of 2,6-toluenediisocyanate;
    (b) a polyether triol having an equivalent weight from about 500 to about 2500;
    (c) a minor amount of a cross-linking polyol;
    (d) the following ingredients in parts by weight based on 100 parts of said polyether triol:
        (i) from about 4 to about 30 parts of antimony oxide;
        (ii) from about 4 to about 40 parts of a polyhalogenated aromatic compound; and
        (iii) from about 30 to about 60 parts of a finely divided hydrated alkali or alkaline earth metal inorganic salt wherein a mole of said salt contains at least 5 moles of water of hydration; and wherein the ratio of isocyanate equivalents to total equivalents of active hydrogen containing materials falls within a range of from about 0.90:1.0 to about 1.0:1.0.

8. A foam according to claim 7 wherein the hydrated salt (diii) is an alkali metal inorganic salt.

9. A foam according to claim 7 wherein the hydrated salt (diii) is an alkaline earth metal inorganic salt.

10. A foam according to claim 7 wherein the aromatic polyisocyanate mixture (a) is about a 50/50 weight percent mixture of 2,4 and 2,6-toluenediisocyanate.

11. A foam according to claim 7 wherein the polyhalogenated aromatic compound (dii) is decabromodiphenyl ether.

12. A foam according to claim 7 wherein the ratio of isocyanate equivalents to total equivalents of active hydrogen containing materials is about 1.0:1.0.

13. A foam according to claim 10, 11, or 12 wherein the hydrated salt is magnesium sulfate heptahydrate.

* * * * *